United States Patent
Yavuz et al.

(10) Patent No.: US 10,547,455 B1
(45) Date of Patent: Jan. 28, 2020

(54) ENERGY-AWARE DIGITAL SIGNATURES

(71) Applicant: University of South Florida, Tampa, FL (US)

(72) Inventors: Attila Altay Yavuz, Tampa, FL (US); Muslum Ozgur Ozmen, Tampa, FL (US); Rouzbeh Behnia, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/273,828

(22) Filed: Feb. 12, 2019

Related U.S. Application Data

(60) Provisional application No. 62/788,572, filed on Jan. 4, 2019.

(51) Int. Cl.
*H04L 29/06* (2006.01)
*H04L 9/32* (2006.01)
(Continued)

(52) U.S. Cl.
CPC .......... *H04L 9/3247* (2013.01); *H04L 9/0869* (2013.01); *H04L 9/3073* (2013.01); *H04L 9/3226* (2013.01)

(58) Field of Classification Search
None
See application file for complete search history.

(56) References Cited

U.S. PATENT DOCUMENTS 6,091,819 A * 7/2000 Venkatesan ........... H04L 9/3013
380/28
6,298,153 B1   10/2001 Oishi
(Continued)

FOREIGN PATENT DOCUMENTS

CN        101969438 B     10/2013

OTHER PUBLICATIONS

Ozmen and Yavuz, "Low-cost standard public key cryptography services for wireless iot systems," in Proceedings of the 2017 Workshop on Internet of Things Security and Privacy, ser. IoTS&P '17. New York, NY, USA: ACM, 2017, pp. 65-70. [Online]. Available: http://doi.acm.org/10.1145/3139937.3139940) (Year: 2017).*

(Continued)

*Primary Examiner* — Andrew J Steinle
(74) *Attorney, Agent, or Firm* — Meunier Carlin & Curfman LLC

(57) ABSTRACT

A digital signature protocol achieves the least energy consumption, the fastest signature generation, and the smallest signature among its ECC-based counterparts. The method of authenticating is also immune to side channel attacks aiming elliptical curve operations/exponentiations as well as to weak pseudo random number generators at the signer's side. A security system for authenticating the updating of computer records includes a network of member computers in data communication with each other and calculating an assigned portion of a commitment code used for the authenticating the secure data at the verifier device by completing, among the server computers, a plurality of discrete verification tasks for a single authentication code ($R^-$) associated with an aggregated commitment code (R), aggregating at the verifier device, the aggregated commitment code (R), and verifying the secure data at the verifier device.

19 Claims, 4 Drawing Sheets

(51) Int. Cl.
H04L 9/08 (2006.01)
H04L 9/30 (2006.01)

(56) References Cited

U.S. PATENT DOCUMENTS

| | | | | |
|---|---|---|---|---|
| 8,621,212 | B2* | 12/2013 | Lim | G06F 21/73 347/86 |
| 9,350,550 | B2 | 5/2016 | Nix | |
| 9,998,445 | B2* | 6/2018 | Wallrabenstein | H04L 63/0853 |
| 10,164,966 | B2 | 12/2018 | Wilson | |

OTHER PUBLICATIONS

I. S. P. Nguyen and J. Stern, "Distribution of modular sums and the security of the server aided exponentiation," in Proc. Workshop on Cryptography and computational Number Theory (CCNT'99), vol. 20. Springer Berlin Heidelberg, pp. 257-268 (Year: 1999).*
M. Rushanan, A. D. Rubin, D. F. Kune, and C. M. Swanson, "Sok: Security and privacy in implantable medical devices and body area networks," in Proceedings of the 2014 IEEE Symposium on Security and Privacy, ser. SP '14. IEEE Computer Society, 2014, pp. 524-539.
M. O. Ozmen and A. A. Yavuz, "Low-cost standard public key cryptography services for wireless iot systems," in Proceedings of the 2017 Workshop on Internet of Things Security and Privacy, ser. IoTS&P '17. New York, NY, USA: ACM, 2017, pp. 65-70. [Online]. Available: http://doi.acm.org/10.1145/3139937.3139940.
C. Camara, P. Peris-Lopez, and J. E. Tapiador, "Security and privacy issues in implantable medical devices: A comprehensive survey," Journal of Biomedical Informatics, vol. 55, pp. 272-289, 2015.
M. Vigil, J. Buchmann, D. Cabarcas, C. Weinert, and A. Wiesmaier, "Integrity, authenticity, non-repudiation, and proof of existence for long-term archiving: A survey," Computers & Security, vol. 50, pp. 16-32, 2015. [Online]. Available: http://www.sciencedirect.com/science/article/pii/S0167404814001849.
A. Ometov, P. Masek, L. Malina, R. Florea, J. Hosek, S. Andreev, J. Hajny, J. Niutanen, and Y. Koucheryavy, "Feasibility characterization of cryptographic primitives for constrained (wearable) IoT devices," in 2016 IEEE International Conference on Pervasive Computing and Communication Workshops (PerCom Workshops), Mar. 2016, pp. 1-6.
A. A. Yavuz, "Eta: efficient and tiny and authentication for heterogeneous wireless systems," in Proceedings of the sixth ACM conference on Security and privacy in wireless and mobile networks, ser. WiSec '13. New York, NY, USA: ACM, 2013, pp. 67-72.
G. Ateniese, G. Bianchi, A. T. Capossele, C. Petrioli, and D. Spenza, "Low-cost standard signatures for energy-harvesting wireless sensor networks," ACM Trans. Embed. Comput. Syst., vol. 16, No. 3, pp. 64:1-64:23, Apr. 2017.
V. Boyko, M. Peinado, and R. Venkatesan, "Speeding up discrete log and factoring based schemes via precomputations," in Advances in Cryptology-EUROCRYPT'98: International Conference on the Theory and Application of Cryptographic Techniques Espoo, Finland, May 31-Jun. 4, 1998 Proceedings. Springer Berlin Heidelberg, 1998, pp. 221-235.
A. Shamir and Y. Tauman, "Improved online/offline signature schemes," in Proceedings of the 21st Annual International Cryptology Conference on Advances in Cryptology, ser. CRYPTO '01. London, UK: Springer-Verlag, 2001, pp. 355-367.
D. Bernstein, N. Duif, T. Lange, P. Schwabe, and B.-Y. Yang, "Highspeed high-security signatures," Journal of Cryptographic Engineering, vol. 2, No. 2, pp. 77-89, 2012.
C. Costello and P. Longa, "FourQ: Four-dimensional decompositions on a Q-curve over the mersenne prime," in Advances in Cryptology—ASIACRYPT 2015, T. Iwata and J. H. Cheon, Eds. Springer Berlin Heidelberg, 2015, pp. 214-235.
M. Bellare and P. Rogaway, "Random oracles are practical: A paradigm for designing efficient protocols," in Proceedings of the 1st ACM conference on Computer and Communications Security (CCS '93). NY, USA: ACM, 1993, pp. 62-73.
C. Pereida García, B. B. Brumley, and Y. Yarom, "Make Sure DSA Signing Exponentiations Really Are Constant-Time", in Proceedings of the 2016 ACM SIGSAC Conference on Computer and Communications Security, ser. CCS '16. New York, NY, USA: ACM, 2016, pp. 1639-1650.
R. R. Jueneman, "Securing wireless medicine confidentiality, integrity, nonrepudiation, malware prevention," in Emerging Technologies for a Smarter World (CEWIT), 2011 8th International Conference Expo on, Nov. 2011, pp. 1-5.
C. Schnorr, "Efficient signature generation by smart cards," Journal of Cryptology, vol. 4, No. 3, pp. 161-174, 1991.
I. Goldberg, "Improving the robustness of private information retrieval," in 2007 IEEE Symposium on Security and Privacy (SP '07), 2007, pp. 131-148.
I. S. P. Nguyen and J. Stern, "Distribution of modular sums and the security of the server aided exponentiation," in Proc. Workshop on Cryptography and computational Number Theory (CCNT'99), vol. 20. Springer Berlin Heidelberg, pp. 257-268.
D. Pointcheval and J. Stern, "Security proofs for signature schemes," in Proc. of the 15th International Conference on the Theory and Application of Cryptographic Techniques (EUROCRYPT '96). Springer-Verlag, 1996, pp. 387-398.
M. Bellare and G. Neven, "Multi-signatures in the plain public-key model and a general forking lemma," in Proceedings of the 13th ACM Conference on Computer and Communications Security, ser. CCS '06. New York, NY, USA: ACM, 2006, pp. 390-399.
P. Szakacs-Simon, S. A. Moraru, and F. Neukart, "Signal conditioning techniques for health monitoring devices," in 2012 35th International Conference on Telecommunications and Signal Processing (TSP), Jul. 2012, pp. 610-614.
J.-P. Aumasson, L. Henzen, W. Meier, and R. C.-W. Phan, "Sha-3 proposal blake," Submission to NIST (Round 3), 2010. [Online]. Available: http://131002.net/blake/blake.pdf.
D. J. Bernstein, "New stream cipher designs," M. Robshaw and O. Billet, Eds. Berlin, Heidelberg: Springer-Verlag, 2008. The Salsa20 Family of Stream Ciphers, pp. 84-97. [Online]. Available: http://dx.doi.org/10.1007/978-3-540-68351-3_8.
M. Hutter and P. Schwabe, "NaCl on 8-bit AVR microcontrollers," in Progress in Cryptology—AFRICACRYPT 2013, ser. Lecture Notes in Computer Science, vol. 7918. Springer-Verlag Berlin Heidelberg, 2013, pp. 156-172, http://cryptojedi.org/papers/\#avrnacl.
Z. Liu, P. Longa, G. C. C. F. Pereira, O. Reparaz, and H. Seo, "FourQ on embedded devices with strong countermeasures against side-channel attacks," in Cryptographic Hardware and Embedded Systems—CHES 2017, W. Fischer and N. Homma, Eds. Cham: Springer International Publishing, 2017, pp. 665-686.
L. Reyzin and N. Reyzin, "Better than BiBa: Short one-time signatures with fast signing and verifying," in Proceedings of the 7th Australian Conference on Information Security and Privacy (ACIPS '02). Springer-Verlag, 2002, pp. 144-153.
K. Kalach and R. Safavi-Naini, "An efficient post-quantum one-time signature scheme," in Selected Areas in Cryptography—SAC 2015, O. Dunkelman and L. Keliher, Eds. Cham: Springer International Publishing, 2016, pp. 331-351.
D. J. Bernstein, D. Hopwood, A. Hülsing, T. Lange, R. Niederhagen, L. Papachristodoulou, M. Schneider, P. Schwabe, and Z. Wilcox-O'Hearn, "SPHINCS: Practical stateless hash-based signatures," in Advances in Cryptology—EUROCRYPT 2015: 34th Annual International Conference on the Theory and Applications of Cryptographic Techniques. Springer Berlin Heidelberg, Apr. 2015, pp. 368-397.
A. Perrig, R. Canetti, D. Song, and D. Tygar, "Efficient and secure source authentication for multicast," in Proceedings of Network and Distributed System Security Symposium, Feb. 2001.
W. B. Jaballah, M. Conti, R. D. Pietro, M. Mosbah, and N. V. Verde, "Mass: An efficient and secure broadcast authentication scheme for resource constrained devices," in 2013 International Conference on Risks and Security of Internet and Systems (CRiSIS), Oct. 2013, pp. 1-6.

(56) References Cited

OTHER PUBLICATIONS

ANSI X9.62-1998: Public Key Cryptography for the Financial Services Industry: The Elliptic Curve Digital Signature Algorithm (ECDSA), American Bankers Association, 1999.

M. Wazid, A. K. Das, N. Kumar, M. Conti, and A. V. Vasilakos, "A novel authentication and key agreement scheme for implantable medical devices deployment," IEEE Journal of Biomedical and Health Informatics, vol. 22, No. 4, pp. 1299-1309, Jul. 2018.

* cited by examiner (a) Energy of Signature Generation vs Pulse Sensor

ENERGY-AWARE DIGITAL SIGNATURES

CROSS REFERENCE TO RELATED APPLICATIONS

This application claims priority to and incorporates entirely by reference U.S. Provisional Patent Application Ser. No. 62/788,572 filed on Jan. 4, 2019, and entitled Energy-Aware Digital Signatures.

STATEMENT REGARDING FEDERALLY SPONSORED RESEARCH

None.

FIELD

One non-limiting goal of this disclosure is to devise an energy-aware and compact digital signature scheme that can meet some of the stringent battery and memory requirements of highly resource-limited devices connected on a network (e.g., implantable medical devices and other instruments collectively called the Internet of Things (IoT)) that must operate for long time periods with a minimal intervention.

BACKGROUND

It is essential to provide authentication and integrity services for emerging Internet of Things (IoT) systems that include resource-constrained devices. Due to their computational efficiency, symmetric key primitives (e.g., message authentication codes) are usually preferred for such systems. On the other hand, these primitives might not be scalable for large and ubiquitous systems, and they also do not offer public verifiability and non-repudiation properties, which are essential for some IoT applications [1], [2], [3]. For instance, in financial IoT applications and implantable medical devices, digital forensics (e.g., legal cases) need non-repudiation and public verifiability [2], [3], [4]. Moreover, such systems may include many devices that require scalability.

Digital signatures rely on public key infrastructure and achieve a scalable authentication with non-repudiation and public verifiability. Therefore, they are an ideal authentication tool for security and safety critical IoT applications. On the other hand, most of the compact digital signatures (e.g., elliptic curve (EC) based signatures) require costly operations such as elliptical curve scalar multiplication and addition during signature generation. It has been shown [5], [6], [7], and further demonstrated by our experiments that, these operations can be energy costly, and therefore, can negatively impact the battery life of highly resource-limited embedded devices. For instance, as one of the many potential applications, embodiments herein can refer to a resource-limited sensor (e.g., a medical device [1]) that frequently generates and digitally signs sensitive data (medical readings), which are verified by a resourceful cloud service provider.

There are two main lines of work to offer authentication for embedded medical devices: symmetric key primitives (e.g., MACs) and public key primitives (e.g., digital signatures).

One-time signatures (e.g., [6], [26], [27]) offer high computational efficiency, but usually have very large key and signature sizes that hinder their adoption in implantable medical devices. Moreover, they can only sign a pre-defined number of messages with a key pair, which introduce key renewal overhead. The extensions of hash-based one-time signatures to multiple-time signatures (e.g., SPHINCS [28] have extreme signing overhead, and therefore are not suitable for medical implantables. Some MAC based alternatives (e.g., TESLA [29], [30]) use time asymmetries to offer computational efficiency and compactness, they cannot offer non-repudiation and requires a continuous time synchronization. Elliptical Curve-based digital signatures (e.g., [11], [25], [31], [32], [33]) are currently the most prevalent alternatives to be used on embedded devices due to their compact key/signature sizes and a better signing efficiency compared to other standard signatures (e.g., RSA, multiple-time signatures).

There is a critical need for lightweight signatures that can meet the computation, memory and battery limitations of these IoT applications.

SUMMARY

Embodiments herein proposed ESEM, that achieves the least energy consumption, the fastest signature generation along with the smallest signature among its ECC-based counterparts. ESEM is also immune to side channel attacks aiming EC operations/exponentiations as well as to weak pseudo random number generators at the signer 100's side. Embodiments herein believe ESEM is highly preferable for applications wherein the signer 100 efficiency is a paramount requirement, such as implantable medical devices. Embodiments herein implemented ESEM and its counterparts both on a resource-constrained device commonly used in medical devices (i.e., 8-bit AVR ATmega 2560 microcontroller) and a commodity hardware. Our experiments validate the significant energy efficiency and speed advantages of ESEM at the signer 100's side over its counterparts.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

DETAILED DESCRIPTION

Figure 1:
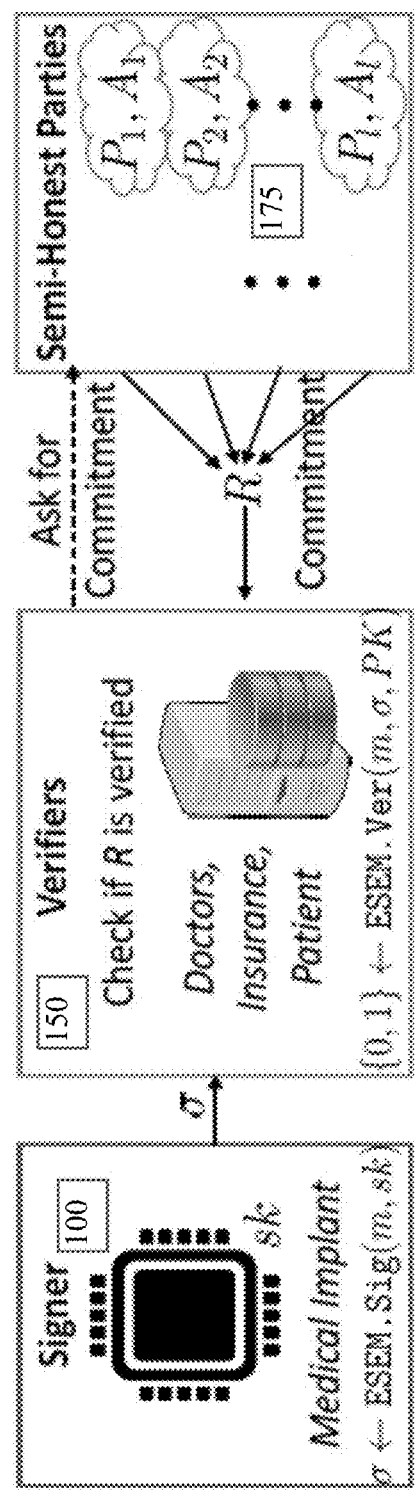
FIG. 1 is a schematic representation of a network of member computers and verifier 150 parties as disclosed herein.

The following description of the disclosure is provided as an enabling teaching of the disclosure in its best, currently known embodiment(s). To this end, those skilled in the relevant art will recognize and appreciate that many changes can be made to the various embodiments of the embodiments described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Unless defined otherwise, all technical and scientific terms used herein have the same meaning as commonly understood to one of ordinary skill in the art to which this disclosure belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby specifically by reference in their entireties and at least for the material for which they are cited.

Authentication is vital for the Internet of Things (IoT) applications involving medical and financial systems and other environments utilizing sensitive, confidential information. Digital signatures offer scalable authentication with non-repudiation (i.e., no deniability of any verifier 150) and public verifiability, which are necessary for auditing and dispute resolution in such IoT applications. However, digital signatures have been shown to be highly costly for low-end devices used in IoT, especially when embedded devices (e.g., medical implants, wireless sensors, RF tags) must operate without a battery change for a long time or use renewable sources of energy such as small solar cells.

This disclosure proposes a new digital signature scheme referred to as Energy-aware Signature for Embedded Medical devices (ESEM) that achieves a near-optimal signer 100 efficiency. Specifically, ESEM signature generation does not require any costly operations (e.g., elliptic curve (EC) scalar multiplication/addition), but only a "small-constant" number of pseudo-random function calls, additions, and a single modular multiplication. ESEM has the smallest signature among its EC-based counterparts with an identical private key size. This disclosure achieved this, in part and without limiting the embodiments, by eliminating the commitment value from the signing procedure for Schnorr-type signatures. This advancement occurred, in at least one embodiment, via a distributed construction at the verifier 150 without interaction with the signer 100, while permitting a constant-sized public key. This proved that ESEM is secure (in random oracle model), and test examples fully implemented it on an 8-bit AVR AT-mega 2560 microcontroller (AVR) that is commonly used in medical devices, for example and without limiting the disclosure to one single embodiment or use. Experiments showed that ESEM achieves 8.4 times higher energy efficiency over its closest counterpart while offering a smaller signature and code size. Hence, ESEM can be suitable for deployment on highly resource limited embedded devices in critical IoTs.

Design objectives for this disclosure optionally include some or all of the resource considerations explained below, but these objectives are not considered to be limiting or exclusive requirements in any way:

(i) In one non-limiting embodiment, the signature generation should not require any costly operation (e.g., exponentiation, elliptical curve (EC) operations), but only symmetric cryptographic functions and basic arithmetics (e.g., modular addition).

(ii) In another non-limiting embodiment, the low-end devices are generally not only computation/battery limited but also memory limited. Hence, in one sense, i.e., objective (i) above should be achieved without consulting pre-computed storage (e.g., Boyko-Peinado-Venkatesan (BPV) tables [8], or online/offline signatures [9]).

(iii) In another non-limiting embodiment, the signing should not draw a new randomness [10] to avoid potential hurdles of weak pseudo-random number generators.

(iv) In another non-limiting embodiment, the size of the signature should be small and constantly-sized as in Schnorr-like signatures.

(v) In another non-limiting embodiment, the size of public key should be constant.

This disclosure shows, therefore, a new digital signature scheme referred to, without limitations, as Energy-aware Signature for Embedded Medical devices (ESEM), which is ideal for the signature generation on highly resource-limited IoT devices. The term "medical" in the acronym ESEM is used only as one example of the environment in which the techniques described herein are applicable. The phrase "Energy-aware Signature for Embedded Medical devices" and acronym "ESEM," therefore, are used for illustration purposes only, and neither the phrase nor the acronym limits this disclosure to any particular context. Another subject area or environment could use different phrases and acronyms and remain within the scope of the disclosure herein, including the claimed embodiments below.

The research shows that the realizations of Schnorr-like signatures on efficient elliptic curves (e.g., FourQ [11]) are currently the most efficient solutions, and a generation of the commitment value via a scalar multiplication is the main performance bottleneck in these schemes.

One idea developed herein is to completely eliminate the generation, storage and transmission of this commitment from the signing of Schnorr signatures. To achieve this, the method of this disclosure first develops a new algorithm that called Signer Non-interactive Distributed BPV (SNOD-BPV), which permits a distributed construction of the "commitment" for a given signature at the verifier 150's side, without requiring any interaction with the signer 100. Next, the method transforms the signature generation process such that the correctness and provable security are preserved once the commitment value is separated from message hashing and SNOD-BPV is incorporated into ESEM. Results prove that ESEM is secure in the random oracle model [12] under a "semi-honest" distributed setting for SNOD-BPV. The term semi-honest refers to the fact that a fully "honest" verification requires all of the verifier 150 participants to ensure a signature is valid. Neither the signer 100 nor any one verifier 150 party can be the only participant in the authentication process, so no single entity can be considered "fully" honest. The fully honest authentication relies on a team of "semi-honest" verifying parties 175.

By implementing ESEM and its counterparts both on an AVR ATmega 2560 microcontroller (as one non-limiting example of microcontrollers available) and a commodity hardware, the data provided a detailed comparison below. This disclosure showed experiments to assess the battery consumption of ESEM and its counterparts when they are used with common IoT sensors (e.g., a pulse and pressure sensor).

Desirable Properties of ESEM:

The desirable properties, which do not limit the disclosure in any way, follows. Table I gives a high-level comparison of ESEM with its counterparts in terms of signing efficiency on 8-bit AVR processor:

signer 100, it is not vulnerable to these types of attacks. (ii) The security of Schnorr-like signatures are sensitive to weak random number generators. The signing of ESEM does not consume a new randomness (as in [10]), and therefore can avoid these problems. (iii) This disclosure proves that ESEM is EU-CMA secure in the random oracle model [12].

Potential Use-Cases:

In many IoT applications, extending the battery life of low-end sensors (i.e., signer $100s$) is a priority, while verifier $150s$ generally use a commodity hardware (e.g., a server, tablet) with reasonable storage and communication capabilities. In particular, the energy efficiency is a vital concern for embedded medical devices, as they are expected to operate reliably for long periods of time. Currently, symmetric cryptography is preferred to provide basic security services for such devices [14]. At the same time, the ability to produce publicly verifiable authentication tags with non-repudiation is a desirable property for medical systems [2], [3], [4] (e.g., digital forensics and legal cases). Moreover, a scalable integration of various medical apparatuses to the IoT realm will receive a significant benefit from the ability to deploy digital signatures on these devices [1]. ESEM takes a step towards meeting this need, as it is currently the most energy efficient alternative with small signature and private key sizes. Traditional wireless sensor networks and

TABLE I

Signature generation performance of ESEM and its counterparts on AVR ATmega 2560 microcontroller

| Scheme | CPU cycles | Signing Speed (ms) | Code Size (Byte) | Signature Size (Byte) | Private Key (Byte) | CPU energy (mJ) |
| --- | --- | --- | --- | --- | --- | --- |
| ECDSA | 79 185 664 | 4949 | 11 990 | 64 | 32 | 494.91 |
| BPV-ECDSA | 23 519 232 | 1470 | 27 912 | 64 | 10 272 | 146.99 |
| Ed25519 | 34 342 230 | 2146 | 17 373 | 64 | 32 | 214.64 |
| SchnorrQ | 5 174 800 | 323 | 29 894 | 64 | 32 | 32.34 |
| ESEM | 616 896 | 38 | 18 465 | 48 | 32 | 3.85 |

We use low-arc implementations due to the memory constraints of ATmega 2560. Note the ESEM does not store sny pre-computed components (e.g., BPV tables)

Signing and Energy Efficiency:

The signature generation of ESEM does not require any elliptical curve (EC) operations (e.g., scalar multiplication, addition) or exponentiation, but only pseudorandom function (PRF) calls, modular additions and a single modular multiplication. Therefore, ESEM achieves the lowest energy consumption among their counterparts. For example, ESEM consumes 8× and 55× less battery than SchnorrQ, and Ed25519, respectively. The disclosed experiments indicate that ESEM can substantially extend the battery life of low-end devices integrated with IoT applications (see Section V). Similarly, ESEM is at least a magnitude of times faster than Ed25519 both in an 8-bit microcontroller and commodity hardware. This gap further increases when our high-speed variant ESEM2 is considered.

Small Private Key and Signature Sizes:

ESEM has the smallest signature size among its counterparts (48 Bytes for k=128) with an identical private key size. ESEM does not require any pre-computation tables to be stored at the signer 100, and therefore it is significantly more storage and computation efficient than schemes relying on BPV at the signer 100's side. Moreover, ESEM has a small signer 100 code size since it only requires symmetric primitives and basic arithmetics.

High Security:

(i) Side-channel attacks exploiting the EC scalar multiplication implementations in ECDSA were proposed [13]. Since ESEM does not require any EC operations at the IoT sensors pervasively deployed in smart cities are also expected to receive a benefit from ESEM.

Miscellaneous:

The signature verification of ESEM is distributed, wherein a verifier 150 reconstructs the commitment value of a signature with L number of parties. However, as confirmed with our experiments, this only results in a few milliseconds of delay at the verifier 150. Moreover, the signer 100 does not need an interaction with any parties to compute signatures. Parties aiding the verification are assumed to be "semi-honest" and non-colluding (as in traditional semi-honest secure multi-party computation). In one example case, even (L−1) parties collude, ESEM remains EUCMA secure. Since ESEM is designed for a near-optimal signer 100 performance, this disclosure shows to a reasonable certainty that ESEM is suitable for its target applications as outlined above, where a few milliseconds of delay and interaction can be tolerated at the verifier 150.

Next, this disclosure presents one non-limiting proposed scheme for Energy-aware Signature for Embedded Medical devices (ESEM).

A. Notation and Definitions

Notation: $\|$ and $|x|$ denote concatenation and the bit length of variable x, respectively. $x \leftarrow^\$ S$ means variable x is randomly selected from set S. $|S|$ denotes the cardinality of set S. This disclosure denotes by $\{0,1\}^*$ the set of binary strings of any finite length. The set of items $q_i$ for (i=0 to n−1) is denoted by $\{q_i\}_{i=0}^{n-1} \cdot \log x$ and means $\log_2 x$. $A^{O_0, \ldots, O_i}(.)$ denotes algorithm A is provided with oracles $O_0$ to $O_i$. For example, $A^{SGN.Sig_{sk}}(.)$ denotes algorithm A is provided with a signing oracle of algorithm Sig of signature scheme SGN under a private key sk. A pseudo-random function (PRF) is defined and three hash functions to be used in one non-limiting example schemes as follows:

$PRF_0$: $\{0,1\}_* \rightarrow \{0,1\}^K$, $H_0$: $\{0,1\}^* \rightarrow \{0,1\}^K$, $H_1$: $\{0,1\}^* \rightarrow \{0,1\}^{v \cdot \log n}$ and $H_2$: $\{0,1\}^* \rightarrow \mathbb{Z}^*_q$, where $1 < v < n$ are integers.

Definition 1. A signature scheme SGN is a tuple of three algorithms (Kg, Sig, Ver) defined as follows: $(sk, PK) \leftarrow SGN.Kg(1^K)$: Given the security parameter $1^K$, the key generation algorithm returns a private/public key pair (sk,PK).

$\sigma \leftarrow SGN.Sig(m, sk)$: The signing algorithm takes a message $m \in \{0,1\}^*$ and a sk, and returns a signature $\sigma$.

$b \leftarrow SGN.Ver(m, \sigma, PK)$: The verification algorithm takes a message m, signature $\sigma$ and the public key PK as input. It returns a bit b: 1 means valid and 0 means invalid. This is based in part on Schnorr signature [15].

Definition 2. Schnorr signature scheme is a tuple of three algorithms (Kg, Sig, Ver) defined as follows:

$(y, Y) \leftarrow Schnorr.Kg(1^K)$: Given $1^K$ as the input,
1) The system-wide params$\leftarrow (q, p, \alpha)$, where q and p are large primes such that $p > q$ and $q | (p-1)$, and a generator $\alpha$ of the subgroup G of order q in $\mathbb{Z}^*_p$.
2) Generate private/public key pair $$\left(y \xleftarrow{\$} \mathbb{Z}^*_q, Y \leftarrow \alpha^y \bmod p\right).$$

Suppress parameters afterwards for the brevity.

($\sigma \leftarrow Schnorr.Sig(m, y)$): Given $m \in \{0,1\}^*$ and y as the input, it returns a signature $\sigma = (s, e)$, where H: $\{0, 1\}^* \rightarrow \mathbb{Z}^*_q$ is a full domain hash function.
1) $r \xleftarrow{\$} \mathbb{Z}^*_q$, $R \leftarrow \alpha^r \bmod p$.
2) $e \leftarrow H(m \| R)$, $s \leftarrow (r - e \cdot y) \bmod q$.

$b \leftarrow Schnorr.Ver(m, hs, ei, Y)$: The signature verification algorithm takes m, hs,ei and Y as the input. It computes $R^0 \leftarrow Y^e \alpha^s \bmod p$ and returns a bit b, with b=1 indicating valid, if $e = H(m \| R^0)$ and b=0 otherwise. This method uses Boyko-Peinado-Venkatesan (BPV) generator [8].

Definition 3. The BPV generator is a tuple of two algorithms (Offline, Online) defined as follows:

$(\Gamma, v, n, q, p) \leftarrow BPV.Offline(1^K)$: The offline BPV algorithm takes $1^K$ as the input and generates system-wide parameters $(q, p, \alpha)$ as in Schnorr. $Kg(1^K)$ step 1.

BPV parameters n and v are the number of pairs to be pre-computed and the number of elements to be randomly selected out n pairs, respectively, for $2 < v < n$.

$r_i \xleftarrow{\$} \mathbb{Z}^*_q$, $R_i \leftarrow \alpha^{r_i} \bmod p$, $i = 0, \ldots, n-1$.

Set pre-computation table $\Gamma = \{r_i, R_i\}_{i=0}^{n-1}$.

$(r, R) \leftarrow BPV.Online(\Gamma, v, n, q)$: The online BPV algorithm takes the table $\Gamma$ and (v, n, q) as input.

Generate a random set $S \subset [0, n-1]$, where $|S| = v$.

$r \leftarrow \sum_{i \in S} r_i \bmod q$, $R \leftarrow \prod_{i \in S} R_i$.

Lemma 1. The distribution of BPV output r is statistically close to the uniform random distribution with an appropriate choice of parameters (v,n) [8].

B. System and Security Model

As depicted in FIG. 1, one non-limiting system model includes a highly resource-limited signer 100 100 that computes signatures to be verified by any receiver. The system model also includes l distinct parties $(P_1, \ldots, P_l)$ that are involved in signature verification. In the line of [16], after the initialization phase, one considers a synchronous network which consists of a client (verifier 150 in ESEM) and semi-honest servers $P = (P_1, \ldots, P_l)$. In this non-limiting example, assume that the communication channels are secure.

The security notion for a digital signature is Existential Unforgeability against Chosen Message Attack (EU-CMA) [17].

Definition 4. Existentially Unforgeability under Chosen Message Attack (EU-CMA) experiment $Expt_{SGN}^{EU-CMA}$ for a signature scheme SGN=(Kg, Sig, Ver) is defined as follows.

$(sk, pk) \leftarrow SGN.Kg(1^K)$ $(M_*, \sigma_*) \leftarrow A_{SGN.Sig(.)}(pk)$ A wins the above experiment if $1 \leftarrow SGN.Ver(M^*, \sigma^*, pk)$ and $m^*$ was not queried to SGN. Sig(.) oracle. The EMU-CMA advantage Adv (SGN to EU-CMA) of A is defined as $Pr[Expt(SGN \text{ to } EU\text{-}CMA) = 1]$.

Definition 5. A protocol is t-private [16] if any set of parties S with $|S| \leq t$ would not be able to compute or achieve any output or knowledge any different than what they could have done individually from their set of private input and outputs.

Assumption 1. In one non-limiting embodiment, this disclosure may assume that the servers are honest-but-curious and generally always follows the protocol, but try to learn as much as possible from the shared or observed information.

For $t = l - 1$, where l is the total number of the servers, our proposed scheme is t-private. The signature generation in our scheme does not require the participation of the servers. In other words, the signer 100 100 does not need to interact with any of the l servers during the signature generation. The participation of all the l servers is however required on the verifier 150's side.

A. High-Level Design

Schnorr-like signatures with implementations on recent ECs (e.g., FourQ [11]) are currently among the most efficient and compact digital signatures. Hence, Embodiments herein take them as our starting point. In these schemes, the signer 100 100 generates a random value r and its commitment $R = \alpha^r \bmod p$, which is incorporated into both signing and verification (as an input to hash along with a message). This exponentiation (EC scalar multiplication) constitutes the main cost of the signature generation, and therefore embodiments herein aim to completely eliminate it from the signing. However, this is a highly challenging task.

1) Commitment Generation without Signer Interaction:

The elimination of commitment R from the signing permits removal of EC operations such as scalar multiplication/additions. It also eliminates the transmission of R and a storage of BPV table at the signer 100. However, the commitment is necessary for the signature verification. Hence, the verifier 150 should obtain a correct commitment for each signature with the following requirements: (i) The verifier 150 cannot interact with the signer 100 to obtain the commitment (i.e., the signer 100 does not have it). (ii) The signer 100 non-interactive construction of the commitment should not reveal the ephemeral randomness r. (iii) Unlike some multiple-time signatures [6], the verifier 150 should not have a pre-fixed limit on the number of signature verifications and/or a linear-size public key.

Embodiments herein propose a new algorithm that embodiments herein refer to as SNOD-BPV, to achieve these requirements. Our idea is to create a distributed BPV technique that permits a set of parties to construct a commitment on behalf of the signer 100. This distributed scheme permits the verifier 150s to obtain the corresponding commitment of a signature from these parties on demand without revealing r or an interaction with the signer 100. Embodiments herein elaborate on SNOD-BPV in Section III-B.

2) Separation of the Commitment from Signature Generation with SNOD-BPV:

The commitment value is generally used as a part of message hashing (e.g., H(M∥R) in Schnorr) in Schnorr-like signatures. To eliminate R from the signature, the commitment must be separated from the message. However, the use of commitment in the message hashing plays a role in the security analysis of Schnorr-like signatures. Moreover, the removal of commitment R from the signing while using r with SNOD-BPV algorithm requires a design adjustment.

Embodiments herein propose our main scheme ESEM that achieves these goals. In the line of [6], embodiments herein use a one-time random value x in the message hashing, but also devise an index encoding and aggregate BPV approach to integrate SNOD-BPV into signature generation. This permits a constant-size public key at the verifier 150 without any interaction with the signer 100. Embodiments herein give the details of ESEM in Algorithm 2.

B. Signer NOn-Interactive Distributed BPV (SNOD-BPV)

Embodiments herein conceive SNOD-BPV as a distributed realization of BPV where L parties hold n public values $(R_{i,j}{}^{n,1}{}_{i=1,j=1})$ of "L" BPV tables, and then can collaboratively derive R without learning its corresponding private key r unless all of them collude. Embodiments herein stress that one cannot simply shift the storage of public values in a BPV table to a single verifier 150. This is because the indexes needed to compute the commitment R should remain hidden in order to protect r[18]. Embodiments herein overcome this challenge by creating a distributed BPV approach that can be integrated into a Schnorr-like signature. At SNOD-BPV.Offline, in step 2, the secret key (y) is used as a seed to derive L secret values $(z_j)^L{}_{j=1}$. Each $z_j$ is used to deterministically generate secret BPV values $(r_{i,j}{}^{n,L}{}_{i=1;j=1}$ i=1, j=1), whose corresponding public values $(R_{i,j})^{n,L}{}_{i=1,j=1}$ are computed in step 4-5 and given to parties ($P_1$-$P_L$).

At the online phase, the sender (i.e., signer 100) generates the aggregated r on its own and the receiver (i.e., verifier 150) generates the aggregated R cooperatively with the parties (P1–PL). The sender first derives a random value x from a keyed hash function (at SNOD-BPV.Sender Step 1), and then deterministically derives $z_j$ values (Step 3) as in SNOD-BPV.Offline. Sender uses the $z_j$, that is only shared with the corresponding party, and the one-time random value x to generate the set (indexes) to be used to aggregate the values. This step is of high importance since this way, the sender commits to the one-time random value x. Sender repeats this process for all l parties and aggregates (adds) all the corresponding ri;j s to derive the resulting r (Step 5).

The verifier 150 proceeds as follows to generate the corresponding $R=\alpha^r$ mod p. At step 1 in SNOD-BPV. Receiver, the verifier 150 communicates with L parties to derive each Rj from them. Upon request, parties first derive the same set (indexes) as the sender (Step 1 in SNOD.Pj-Construct). Then, each party aggregates the corresponding Ri,j that were assigned to them in SNOD-BPV. Offline, and returns the results to the verifier 150. The verifier 150 aggregates all these values at step 2, to derive the corresponding R. Please note that only the parties can create the set (indexes) since only they have their corresponding $z_j$ values. Moreover, since all servers provide $R_j$ that can be generated only by them, unless all of the servers collude, they cannot learn any information about the other indexes or the secret value r. This makes our scheme t-private.

TABLE 2

Algorithm 1

Algorithm 1 Signer Non-Interactive Distributed BPV (SNOD-BPV)
$(A_1,...,A_l) \leftarrow$ SNOD-BPV. Offline($1^k$,y,v,n):
(Given κ, secret key y, and parameters (v, n) generate pre-computation tables).
1:       for j = 1,...,l do
2:           $z_j \leftarrow PRF_0(y\|j)$
3:           for i = 1,...,n do
4:               $r_{i,j} \leftarrow PRF_0(z_j\|i)$
5:               $R_{i,j} \leftarrow \alpha^{r_{i,j}}$ mod p
6:       Set $A_j = (z_j, v, <R_{1,j},...,R_{n,j}>)$
7:       return each $A_j$ to corresponding party $P_j$
(r,x) ← SNOD-BPV. Sender(sk):
1:       $x \leftarrow H_0(sk\|c), c \leftarrow c + 1$
2:       for j = 1,..., v do
3:           $z_j \leftarrow PRF_0(sk\|j)$
4:           $(i_{1,j},...,i_{v,j}) \leftarrow H_1(z_j\|x)$
5:           $r \leftarrow \Sigma$ (k=1 to v) $\Sigma$ (j=1 to l) $PRF_0(z_j\|i_{k,j})$ mod q
6:       return r
$R^-_j \leftarrow$ SNOD.$P_j$-Construct $(A_j,x)$:
Given x and $A_j$, each party $P_j$ returns $R^-_j$.
1:       $(i_{1,j},...,i_{v,j}) \leftarrow H_1(z_j\|x)$
2:       $R^-j \leftarrow \Pi$ (k=1 to v) $R(i(_{k,j})$ to j) mod p
         R ← SNOD.BPV.Receiver(x)
Given x, retrieve its commitment R under PK from $(P_1,...,P_l)$.
1:       Verifier sends x to the parties, and each party $P_j$ returns $R^-_j \leftarrow$ SNOD.$P_j$-Construct($A_j$,x) for j = 1,...,l.
2:       $R \leftarrow \Pi_{j=1}{}^l R^-j$ mod p
3:       return R.

Algorithm 1 as set forth in Table 1 above is an example of Signer NOn-interactive DistributedBPV (SNOD-BPV). The algorithm is set forth in text form below for appropriate publication, search and copy purposes.

$(A_1, \ldots, A_l) \leftarrow$ SNOD-*BPV*. Offline($1^K$,*y*,*v*,*n*):

(Using a given κ, secret key y, and parameters (v, n) generate pre-computation tables).

1:       for j = 1,...,l do
2:           $z_j \leftarrow PRF_0(y\|j)$
3:           for i = 1,...,n do
4:               $r_{i,j} \leftarrow PRF_0(z_j\|i)$
5:               $R_{i,j} \leftarrow \alpha r_{i,j}$ mod p
6:       Set $A_j = (z_j, v, R_{1,j},...,R_{n,j}, i)$
7:       return each $A_j$ to corresponding party $P_j$
              (r,x) ← SNOD-BPV. Sender(sk):
1:       $x \leftarrow H_0(sk\|c), c \leftarrow c + 1$
2:       for j = 1,...,v do
3:           $z_j \leftarrow PRF_0(sk\|j)$
4:           $(i_{1,j},...,i_{v,j}) \leftarrow H_1(z_j\|x)$
5:           r ← Summation (k=1 to v) Summation (j=1 to l) $PRF_0(z_j\|i_{k,j})$ mod q
6:       return r
              $R^-_j \leftarrow$ SNOD.$P_j$-Construct $(A_j,x)$:
Given x and $A_j$, each party $P_j$ returns $R^-_j$.
1:       $(i_{1,j},...,i_{v,j}) \leftarrow H_1(z_j\|x)$
2:       $R^-j \leftarrow \Pi$ (k=1 to v) $R(i(_{k,j})$ to j) mod p
              R ← SNOD-BPV.Receiver(x)
Given x, retrieve its commitment R under PK from $(P_1,...,P_l)$.
1:       Verifier sends x to the parties, and each party $P_j$ returns $R^-_j \leftarrow$ SNOD.$P_j$-Construct($A_j$,x) for j = 1,...,l.
2:       $R \leftarrow Q|j=1 R^-j$ mod p
3:       return R.

TABLE 3

Algorithm 2

Algorithm 2 Energy-aware Signature for Embedded
Medical devices (ESEM)

(sk,PK,A ,...,A) ← ESEM.Kg($1^K$):
1: (y, Y) ← Schnorr.Kg($1^K$), where (q, p, α) as in Schnorr. Kg.
2: Select (v, n) such that $\binom{v}{n} \geq 2^K$
3: ($A_1,...,A_l$) ← SNOD-BPV. Offline ($1^K$, y, v, n)
4: The signer 100 stores sk = (y) and (v, n, q, c = 0).
The verifier 150 stores PK = Y and (v, n, q, p, α).

σ ← ESEM.Sig(m,sk):
1: (r,x) ← SNOD-BPV.Sender(y)
2: s ← r − $H_2$(m||x) · y mod q
3: return σ = (s,x).

{0,1} ← ESEM.Ver(m, σ, PK):
1: R ← SNOD-BPV.Receiver(x)
2: if R = $Y^{H2(m||x)} \cdot \alpha^s$ mod p, return 1, else return 0.

Algorithm 2 set forth in Table 3 above is one non-limiting example of this disclosure implemented as a non-limiting Energy-aware Signature for Embedded Medical devices (ESEM) for a medical environment. As noted above, additional environments are equally available to use the systems, methods and apparatuses of this disclosure. The algorithm is set forth in text form below for appropriate publication, search and copy purposes.

(sk, PK, A, . . . , A) ← ESEM.Kg($1^K$):
1: (y, Y) ← Schnorr.Kg($1^K$), where (q, p, α) as in Schnorr. Kg.
2: Select (v, n) such that $\binom{v}{n} \geq 2^K$
3: ($A_1, \ldots, A_l$) ← SNOD-BPV. Offline ($1^K$, y, v, n)
4: The signer 100 stores sk = (y) and (v, n, q, c = 0). The verifier 150 stores PK = Y and (v, n, q, p, α).

σ ← ESEM.Sig(m,sk):
1: (r,x) ← SNOD-BPV.Sender(y)
2: s ← r − $H_2$(m||x) · y mod q
3: return σ = (s,x).

{0,1} ← ESEM.Ver(m, σ, PK):
1: R ← SNOD-BPV.Receiver(x)
2: if R = $Y^{H2(m||x)} \cdot \alpha^s$ mod p, return 1, else return 0.

C. Energy-Aware Signature for Embedded Medical Devices

Embodiments herein summarize our main scheme ESEM (see Algorithm 2), which permits a near-optimal signing by integrating SNOD-BPV into Schnorr signature with alternations.

During key generation, secret/public key pair (y, Y) and BPV parameters are generated (Step 1-2), followed by SNOD-BPV.Offline(.) algorithm to obtain the distributed BPV public values to be stored by parties ($P_1$-$P_L$). In ESEM.Sig(.) the signer 100 generates the ephemeral random value r and one-time randomness x to be used as the commitment.

Instead of the commitment in Schnorr (R), the signer 100 uses x as the commitment in Step 2. This separation of the commitment R from the message hashing is inspired from [6]. Note that, unlike the multiple-time signature in [6] that can only compute a constant pre-determined number of signatures with a very large linear-size public key, ESEM can compute polynomially unbounded number of signatures with a small constant public key size. Finally, the verifier 150 first calls the SNOD-BPV. Receiver( ) algorithm to generate the public value R, by collaborating with the parties. The signature verification, which is similar to Schnorr with the exception of the commitment x, is performed at Step 2.

1) ESEM2: Embodiments herein point out a trade-off between the private key size and signing speed, which can increase the signature generation performance with the cost of some storage. The signer 100 can store private keys $(r_{i,j})^{n,L}_{i=1,j=1}$ in the memory, and therefore avoid v·L PRF invocations. We refer to this simple variant as ESEM2. An extra storage of 12 KB can boost the performance of ESEM commodity hardware.

Security Analysis

Lemma 2. The scheme proposed in Algorithm 1 is t-private (in the sense of Definition 5) with regard to r and therefore, it can resist against l−1 colluding servers.

Proof. The random values $\{r_{i,j} \leftarrow \text{PRF } 0(z_j||i)\}_{j=1, i=1}^{l,n}$ are generated uniformly at random in the SNOD-BPV.Offline(.) via private seed $z_j$, which is given to each server $P_j$. The security of SNOD-BPV (i.e., ESEM) relies on the secrecy of $$r \leftarrow \sum_{i=1}^{l} \sum_{j=1}^{n} r_{i,j} \bmod q.$$

Given each $r_{i,j}$ is generated uniformly at random via $z_j$'s, and due to Lemma 1, for the adversary A to infer r, it must know all l private seeds $z_j$ or corrupt all the l servers. □

Theorem 1. In the random oracle model, based on Assumption 1 and Lemma 2, if a polynomial-time adversary A can break the EU-CMA security of ESEM in time t and after $q_h$ hash and $q_s$ signature queries, then one can build polynomial-time algorithm F that breaks the EU-CMA security of Schnorr signature in time $t^0$ and $q'_s$ signature queries. Adv (from ESEM to EU-CMA)(t,$q_h$,$q_s$)≤Adv (from Schnorr to EU-CMA)(t', $q'_s$), Proof: If a polynomial-time adversary A breaks the EUCMA security of ESEM, then one can build another polynomially-bounded algorithm F that runs A as a subroutine and breaks Schnorr signature. After setting (y,Y)←Schnorr.Kg($1^K$) and the corresponding parameters (q,p,α), F is run as in Definition 4 as follows. F handles A's and other queries in Definition 4.

Algorithm $F_{Schnorr.Sig_y(.)}$(Y):

Setup: F maintains five lists LM, $HL_0$, $HL_1$, $HL_2$ and LW, all initially empty. LM is a message list that records each message M to be queried to ESEM.Sig oracle by A. $HL_0$, $HL_1$ and $HL_2$ record the input x to be queried to RO(.) oracle and its corresponding RO(.) answer h, respectively. h←$HL_i$ (x), for i∈{0,1,2}, returns the corresponding RO(.) answer of x stored in $HL_i$. LW keeps the record of messages that F queries to Schnorr.Sig oracle. F sets up RO(.) and simulated public keys to initialize ESEM.Sig oracle as follows:

Setup RO(.) Oracle: F implements a function H-Sim to handle RO(.) queries. That is, the cryptographic hash function H is modeled as a random oracle via H-Sim as follows. h←H-Sim(x,$HL_i$): If h∈$HL_i$, for i∈{0,1,2}, then H-Sim returns the corresponding value h←$HL_i$(M). Otherwise, it returns $$h \xleftarrow{\$} \mathbb{Z}_q^*$$

as the answer, inserts (M,h) into $HL_i$, respectively.

Setup Simulated Keys:

F selects parameters (v,n) as in ESEM.Kg(.) Step 1, and works as follows:

1) Queries Schnorr.Sig$^{y(\cdot)}$ on $$y(\bullet) \text{ on } \omega_j \overset{\$}{\leftarrow} \mathbb{Z}_{q_i}^*,$$

and receives signatures $(s^o{}_j, h^o{}_j)$, where $\{R'_j \leftarrow Y^{h_j} \cdot \alpha^{s_j} \bmod p\}_{j=0}^{n-1}$.

2) Sets PK$\leftarrow$Y and system-wide public parameters $(v,n,q,p,\alpha)$ as in ESEM.Kg(.).

3) Sets $z \leftarrow \{0,1\}^K$ and $\gamma = \{s'_j, h'_j\}_{j=0}^{n-1}$ and $\beta = \{R'_j\}_{j=0}^{n-1}$ and inserts $\{w_j\}_{j=0}^{n-1}$ into LW. F also inserts $\{w_j \| R'_j, h'_j\}_{j=0}^{n-1}$ into $HL_2$. F sets the counter $c \leftarrow 0$.

Execute $(M_*, \sigma_*) \leftarrow A_{RO(.),ESEM.Sig_{sk}(.)}(PK)$: F handles A's queries and forgery as follows:

Queries of A: A queries RO(.) and ESEM.Sig$_{sk}$(.) on any message of its choice up to $q_h$ and $q_s$ times, respectively.

1) Handle RO(.) queries: A queries RO(.) on a message M. F calls h$\leftarrow$H-Sim(M,HL$_2$) and returns h to A.

2) Handle ESEM.Sig(.) queries: A queries ESEM.Sig$_{sk}$(.) on any message of its choice M. If M$\in$HL$_1$ then F aborts. Otherwise, F inserts M into LM and then continues as follows.

i) x$\leftarrow$H-Sim(z$\|$c,HL$_0$), (k$_0$, ..., k$_{v-1}$)$\leftarrow$H-Sim(z$\|$x,HL$_1$), and fetch $\{s'_{k_i}, h'_{k_i}\}_{i=0}^{v-1}$ from $\gamma$.

ii)

$$h \leftarrow \sum_{i=0}^{v-1} h'_{k_i} \bmod q, \ \bar{s} \leftarrow \sum_{i=0}^{v-1} \bar{s}'_{k_i} \bmod q,$$

put (M$\|$x,h) in HL$_2$ and return $\sigma=(s,x)$ to A.

Forgery of A: Finally, A outputs a forgery for PK as (M*,$\sigma$*), where $\sigma^* = (s^*, x^*)$. By Definition 4, A wins the EU-CMA experiment for ESEM if ESEM.Ver(M*,$\sigma$*,PK)=1 and M*$\notin$LM Forgery of F: If A fails, F also fails and returns 0. Otherwise, given ESEM forgery $(M^*, \sigma^* = hs^*, x^*i)$ on PK, F checks if M*$\|$x*$\notin$HL$_1$, or x*$\notin$HL$_0$ holds, F aborts. Otherwise, using the forking lemma [19], [20], F rewinds A with the same random tape, to get a new forgery $(M^*, \tilde{\sigma} = \langle \tilde{s}, \tilde{x} \rangle)$. Given, both forgery pairs are valid, embodiments herein have:

$$R_\dagger \equiv (\alpha_y)_{h*} \cdot \alpha_{s*} \bmod p$$

$$R^* \equiv (\alpha^y)^{he} \cdot \alpha_e{}^s \bmod p$$

These equations imply the below modular linear equations.

$$r_* \equiv y \cdot h^* + s^* \bmod q$$

$$r_* \equiv y \cdot h_e + s \bmod q$$

F then extracts Schnorr private key y by solving the above modular linear equations (note that only unknowns are y and r*). F can further verify $Y \equiv \alpha^y \bmod p$. Given that F extracted the Schnorr private key, it is trivial to show that F can produce a valid forgery on any message M**$\notin$LW of its choice on Schnorr public key Y. Therefore, F wins EU-CMA experiment for Schnorr and returns 1.

Probability Analysis & Transcript Indistinguishability:

F may abort during simulation when A queries the ESEM-.SigH oracle, if randomly chosen indexes (k$_0$, ..., k$_{v-1}$) already exist in HL$_1$. The probability that happens is $(q_h-1)q_s/2^l$, $l = v \cdot \log n$. Based on [20, Lemma 1], embodiments herein define the success probability of A as ACC. This probability is defined as ACC$\geq \epsilon_A - (q_h-1)q_s/2^l$, where $\epsilon_A$ is the winning probability of A. The probability of F (i.e., $\epsilon_F$) for breaking Schnorr is given by:

$$\epsilon_F \geq \frac{ACC^2}{q_h + q_s} - \frac{1}{2^l}$$

$$\geq \frac{\epsilon_A^2}{(q_h + q_s)} - \frac{2((q_h-1)q_s)}{2^l(q_h + q_s)}$$

A's view in Algorithm 2 is the public key PK, signatures $(\sigma_1, \ldots, \sigma_{q_s-1})$ and hash outputs. The public key in the simulation has the identical distribution as the one in original ESEM—they are both the output of the Schnorr.Kg(.) algorithm. As for the signatures, $\sigma = (s, x)$, both elements s and x have the same distribution as in the original scheme.

Performance Analysis

A. Parameter Selection

Embodiments herein select Four Q curve that offers fast elliptic curve operations (that is desirable for our verification process, remark that signer 100 has no EC operations) with 128-bit security level [11]. The selection of parameters (v,n) relies on the number of vout-of-n different combinations possible. Embodiments herein select n=1024, v=18 for ESEM and n=128, and v=40 for ESEM$_2$, where both offers over $2^{128}$ different combinations. Lastly, Embodiments herein select l=3 (i.e., 3 parties are involved in verification).

B. Evaluation Metrics and Experimental Setup

Evaluation Metrics: Embodiments herein implemented ESEM and its counterparts both on a low-end device (8-bit microcontroller) and a commodity hardware. (i) At the signer 100's side, the signature generation speed and private key size were evaluated on both types of devices. The energy consumption and code size were evaluated on a low-end device. (ii) The signature size. (iii) At the verifier 150's side, the signature verification speed and the size of public key were evaluated on the commodity hardware.

Note that the time required to transmit the ESEM signature (only 48 Bytes) is already smaller than all of its counterparts. Therefore, we do not include this in our experiments. The bandwidth overhead to construct R between the verifier 150 and 1 parties is only 48 Bytes, and highly depends on the geographic location of the server (i.e., round trip time). Embodiments herein conservatively benchmark this network delay and include in our signature verification time, with an Amazon EC2 server in North Virginia.

Hardware Configurations and Software Libraries:

Embodiments herein selected AVR ATmega 2560 microcontroller as our low-end device due to its low power consumption and extensive use in practice, especially for medical devices [1], [2], [21]. It is an 8-bit microcontroller with 256 KB flash memory, 8 KB SRAM, 4 KB EEPROM and maximum clock speed is 16 MHz.

Embodiments herein implemented our schemes using Rhys Weatherley's library[1], which enables Barrett reduction to compute modulo q. Embodiments herein used BLAKE2s as our hash function from the same library, since it is optimized for low-end devices in terms of speed and code size [22]. Embodiments herein instantiated our PRF function as CHACHA20 stream cipher [23] which offers high efficiency.

To assess our counterparts, Embodiments herein used ECDSA implementation in microECC[2], with which Embodiments herein also implemented BPV-ECDSA. Embodiments herein used the implementations on same microcontroller to assess Ed25519 [24] and SchnorrQ [25].

Embodiments herein powered the microcontroller with a 2200 mAh power pack. ATmega 2560 operates at a voltage level of 5 V and takes 20 mA current[3]. Embodiments herein verified the current readings taken from datasheets by connecting an ammeter between battery and ATmega 2560, and we observed an insignificant difference.

Therefore, Embodiments herein measured the energy consumption with the formula E=V_I_t where t is the computation time. To account the variations in time t, Embodiments herein run each scheme $10^4$ times and took the average.

Embodiments herein also investigated the effect of cryptography on the battery life in some real-life IoT applications. For this purpose, Embodiments herein measured the energy consumption of a pulse sensor[4] and a BMP183 pressure sensor[5]. We expect that the pulse and pressure sensors provide some ideas on the use of digital signatures with sensors in medical devices and daily IoT applications, respectively.

Commodity Hardware: Embodiments herein used an Intel i7-6700HQ 2:6 GHz processor with 12 GB of RAM as the commodity hardware in our experiments. Embodiments herein implemented the arithmetic and curve operations of our scheme with FourQlib6. Embodiments herein used BLAKE2b as our hash function since it is optimized for commodity hardware. Lastly, Embodiments herein instantiated our PRF with AES in counter mode using Intel intrinsics. For our counterparts, Embodiments herein used their base implementations.

As the semi-honest party 175, Embodiments herein used an Amazon EC2 instance located in North Virginia. Our EC2 instance was equipped with an Intel Xeon E5 processor that operates at 2:4 GHz.

Superscript footnotes for above Pars. 51-54 are as follows:
1. https://github.com/rweather/arduinolibs/tree/master/libraries/Crypto
2. https://github.com/kmackay/micro-ecc
3. http://www.atmel.com/Images/Atmel-2549-8-bit-AVR-MicrocontrollerATmega640-1280-1281-2560-2561_datasheet.pdf
4. https://pulsesensor.com/
5. https://cdn-shop.adafruit.com/datasheets/1900_BMP183.pdf
6. https://github.com/Microsoft/FourQlib Performance Evaluation and Comparisons Low-end Device: Table I shows the results obtained from our implementations on 8-bit AVR ATmega 2560.

Signature Generation Speed: ESEM has the fastest signing speed, which is 8:4× and 55× faster than that of SchnorrQ and Ed25519, respectively.

Energy Consumption of Signature Generation: With a 2200 mAh battery, ESEM can generate nearly 800000 signatures, whereas SchnorrQ, Ed25519 and ECDSA can generate only 94482, 14235 and 6173 signatures, respectively. This shows that, ESEM can generate significantly higher number of signatures with the same battery.

Energy Consumption of Signature Generation versus IoT Sensors: Embodiments herein considered a pulse and a pressure sensor to exemplify the potential medical and home automation IoT applications, respectively. Embodiments herein selected the sampling time (i.e., the frequency of data being read from the sensor) as every 10 seconds and every 10 minutes for the pulse and pressure sensor, respectively, to reflect their corresponding use-cases.

Embodiments herein measured the energy consumption by considering three aspects:

(i) Each sensor by default draws a certain energy as specified in its datasheet. The pulse sensor operates at 3 V and draws 4:5 mA of current, while pressure sensor operates at 2:5 V and draws 5 microamps of current. These values are multiplied by their corresponding sampling rates to calculate the energy consumption of the sensor.

(ii) AVR ATmega 2560 consumes energy to make readings from the sensor as well as during its waiting time. Embodiments herein measured the time that takes the microcontroller to have a reading from the sensor as 1 ms. Therefore, Embodiments herein calculated the energy consumption of the microcontroller on active time as 5V–20 mA–1 ms.

(iii) ATmega 2560 requires 10 microamps in power-save mode, which is used to calculate the energy consumption in the idle time.

Figure 2A:
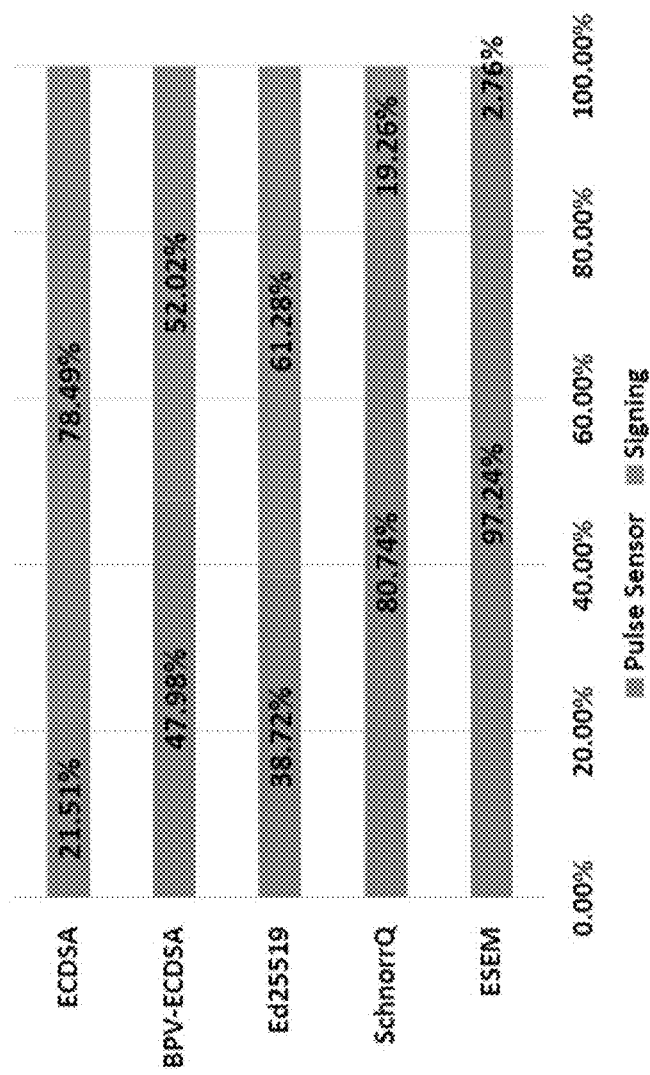
FIG. 2A is a schematic representation of the efficiency for various algorithms used to authenticate data updates at any one of the primary computer, member computers, or verifier 150 party computers as disclosed herein.
Figure 2B:
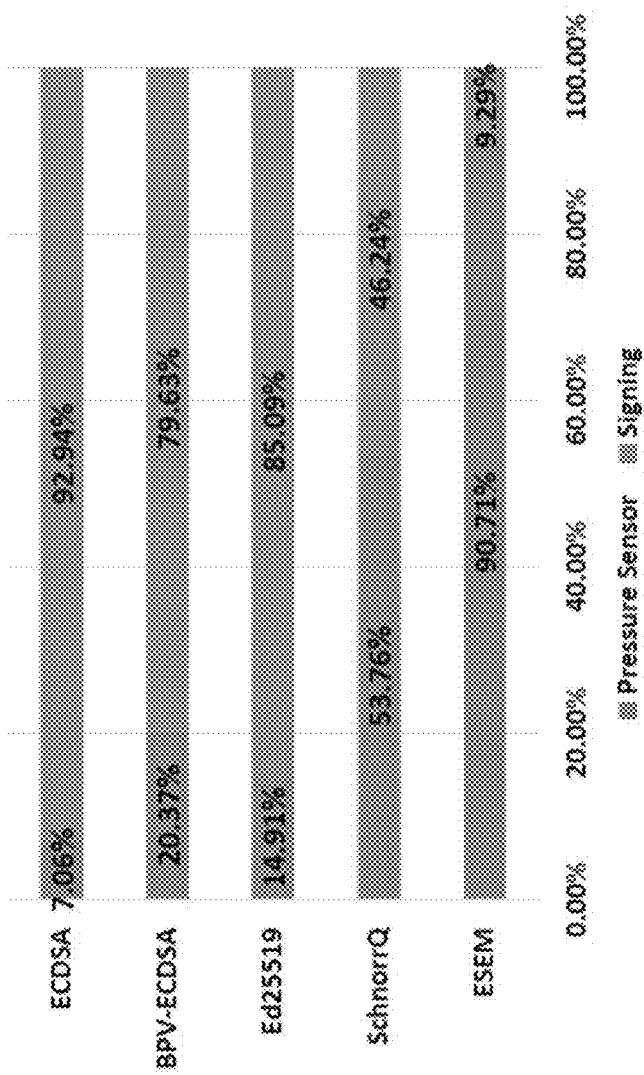
FIG. 2B is a schematic representation of the efficiency for various algorithms used to authenticate data updates at any one of the primary computer, member computers, or verifier 150 party computers as disclosed herein.

Embodiments herein compared the energy consumption of signature generation and IoT sensors in FIGS. 2a and 2b. ESEM reduces the energy consumption of signature generation to 2:76% and 9:29% compared to that of pulse and pressure sensors, respectively.

Observe that, compared with the pressure sensor, SchnorrQ as the fastest counterpart of ESEM, requires 46.24%, while Ed25519 demands 85.09% of the energy consumption. When the pulse sensor is used, while ESEM requires an almost negligible (2.76%) energy consumption, its closest counterpart requires 19.29%. The energy efficiency of ESEM also translates into longer battery life in these applications. More specifically, when pressure sensor is deployed with ESEM, it takes 511 days to drain a 2200 mAh battery, while it is 303 days for our closest counterpart (SchnorrQ). Our experiments show that the existing ECC-based digital signatures consume more energy than IoT sensors, which make them the primary source of battery consumption. On the other hand, ESEM was able to reduce the signature generation overhead to a potentially negligible level in some cases, at minimum offering vast improvements over its counterparts.

Commodity Hardware: Embodiments herein also present the benchmarks of our schemes and counterparts on a commodity hardware, as shown in Table 4.

Table 4. ¶ System wide parameters params (e.g., p,q,α) for each scheme are included in their corresponding codes, and private key size denote to specific private key size.

†Δ represents the communication between the verifier 150 and servers. Since the verifier 150 communicates with l=3 servers, the maximum communication delay is included in our end-to-end delay. This communication is measured to be 37 ms on average by our experiments, with an Amazon EC2 instance in N. Virginia.

| Experimental performance comparison of ESEM schemes and their counterparts on commodity hardware | | | | | | | |
|---|---|---|---|---|---|---|---|
| Scheme | Signing Time (μs) | Private Key[¶] (Byte) | Signature Size (Byte) | Verifier Comp. (μs) | Verifier Storage (Byte) | Server Comp. (μs) | Server Storage (KB) | End-to-End Delay[†] (μs) |
| ECDSA | 725 | 32 | 64 | 927 | 32 | — | — | 1652 |
| BPV-ECDSA | 149 | 10272 | 64 | 927 | 32 | — | — | 1076 |
| Ed25519 | 132 | 32 | 64 | 336 | 32 | — | — | 468 |
| SchnorrQ | 12 | 32 | 64 | 22 | 32 | — | — | 34 |
| ESEM | 11 | 32 | 48 | 24 | 32 | 5 | 32784 | 11 + 24 + 5 + Δ |
| ESEM$_2$ | 4 | 12416 | 48 | 24 | 32 | 10 | 4112 | 4 + 24 + 10 + Δ |

Signature Generation: ESEM and ESEM2 schemes offer the fastest signature generation on commodity hardware as well. Especially ESEM2 (the high-speed variant where private key components are stored instead of generating them from a seed), is 3 times faster than its closest counterpart.

Signature Verification: The signature verification process in ESEM includes verifier 150 computation, server computation and the communication between the verifier 150 and servers. Due to the computational efficiency of FourQ curve, verifier 150 and server computation of ESEM verification is highly efficient. Specifically, verifier 150 computation takes 24 microseconds in ESEM and ESEM2; and server computation takes 5 microseconds, and 10 microseconds for ESEM and ESEM2, respectively. The communication between server and verifier 150 is experimented with our commodity hardware and an Amazon EC2 instance at N. Virginia. This delay was measured as 37 ms on average. The fastest verification is observed at SchnorrQ scheme, that is 22 microseconds. This scheme should be preferred if the verification speed is of high importance. However recall that for our envisioned applications, the signer 100 efficiency (energy efficiency) is of top priority and a few ms delay at the verifier 150 is tolerable.

Exemplary embodiments may include program products comprising computer or machine-readable media for carrying or having machine-executable instructions or data structures stored thereon. For example, the sensors and heating elements may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present disclosure could be accomplished with standard programming techniques with rule based logic and other logic to accomplish the various connection steps, processing steps, comparison steps and decision steps.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present subject matter.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the embodiments claimed herein.

Figure 3:
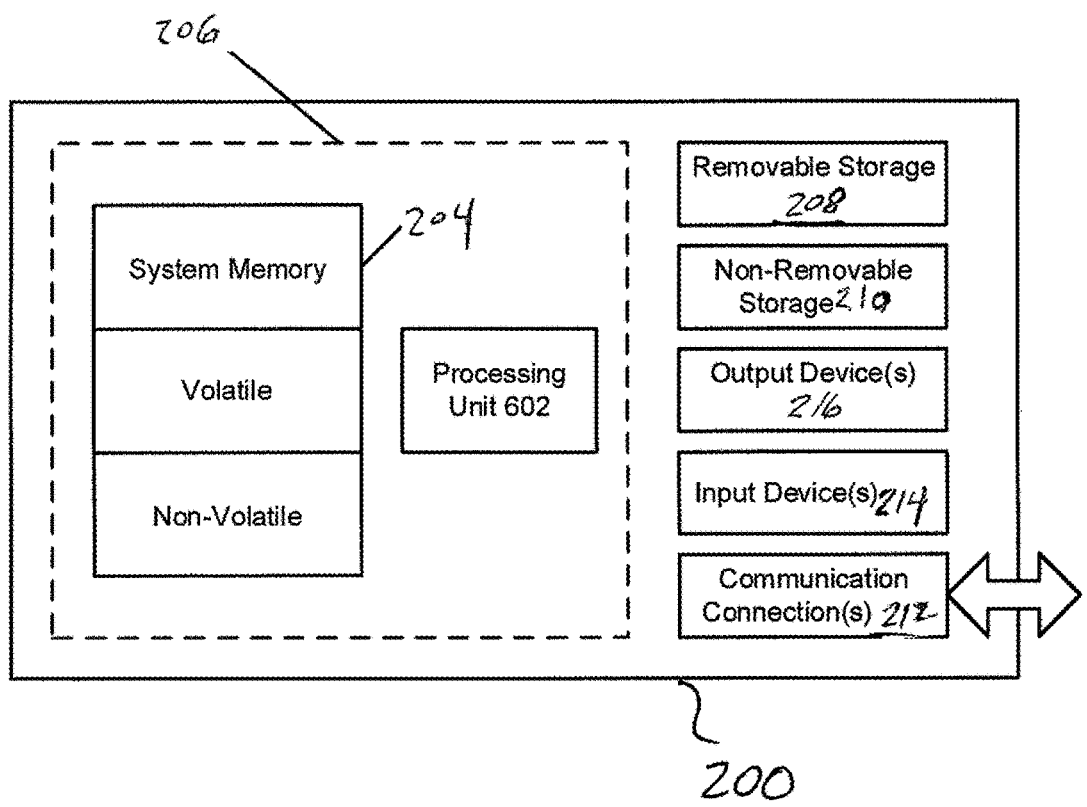
FIG. 3 is a schematic representation of a computer environment in which the details of this disclosure are operable.

FIG. 3 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing aspects described herein includes a computing device, such as computing device 200. In its most basic configuration, computing device 200 typically includes at least one processing unit 202 and memory 204. Depending on the exact configuration and type of computing device, memory 204 may be volatile (such as random access memory (RAM)), non-volatile (such as read-only memory (ROM), flash memory, etc.), or some combination of the two. This most basic configuration is illustrated in FIG. 3 by dashed line 206.

Computing device 200 may have additional features/functionality. For example, computing device 200 may include additional storage (removable and/or non-removable) including, but not limited to, magnetic or optical disks or tape. Such additional storage is illustrated in FIG. 3 by removable storage 208 and non-removable storage 210.

Computing device 200 typically includes a variety of computer readable media. Computer readable media can be any available media that can be accessed by the device 200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 204, removable storage 208, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of computing device 200.

Computing device 200 may contain communication connection(s) 612 that allow the device to communicate with other devices. Computing device 200 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

REFERENCES

[1] M. Rushanan, A. D. Rubin, D. F. Kune, and C. M. Swanson, "Sok: Security and privacy in implantable medical devices and body area networks," in *Proceedings of the 2014 IEEE Symposium on Security and Privacy*, ser. SP '14. IEEE Computer Society, 2014, pp. 524-539.

[2] M. O. Ozmen and A. A. Yavuz, "Low-cost standard public key cryptography services for wireless iot systems," in *Proceedings of the 2017 Workshop on Internet of Things Security and Privacy*, ser. IoTS&P '17. New York, N.Y., USA: ACM, 2017, pp. 65-70. [Online]. Available: http://doi.acm.org/10.1145/3139937.3139940

[3] C. Camara, P. Peris-Lopez, and J. E. Tapiador, "Security and privacy issues in implantable medical devices: A comprehensive survey," *Journal of Biomedical Informatics*, vol. 55, pp. 272-289, 2015.

[4] M. Vigil, J. Buchmann, D. Cabarcas, C. Weinert, and A. Wiesmaier, "Integrity, authenticity, non-repudiation, and proof of existence for long-term archiving: A survey," *Computers & Security*, vol. 50, pp. 16-32, 2015. [Online]. Available: http://www.sciencedirect.com/science/article/pii/S0167404814001849

[5] A. Ometov, P. Masek, L. Malina, R. Florea, J. Hosek, S. Andreev, J. Hajny, J. Niutanen, and Y. Koucheryavy, "Feasibility characterization of cryptographic primitives for constrained (wearable) iot devices," in *2016 IEEE International Conference on Pervasive Computing and Communication Workshops (PerCom Workshops)*, March 2016, pp. 1-6.

[6] A. A. Yavuz, "Eta: efficient and tiny and authentication for heterogeneous wireless systems," in *Proceedings of the sixth ACM conference on Security and privacy in wireless and mobile networks*, ser. WiSec '13. New York, N.Y., USA: ACM, 2013, pp. 67-72.

[7] G. Ateniese, G. Bianchi, A. T. Capossele, C. Petrioli, and D. Spenza, "Low-cost standard signatures for energy-harvesting wireless sensor networks," *ACM Trans. Embed. Comput. Syst.*, vol. 16, no. 3, pp. 64:1-64:23, apr 2017.

[8] V. Boyko, M. Peinado, and R. Venkatesan, "Speeding up discrete log and factoring based schemes via precomputations," in *Advances in Cryptology—EUROCRYPT '98:*

International Conference on the Theory and Application of Cryptographic Techniques Espoo, Finland, May 31-Jun. 4, 1998 Proceedings. Springer Berlin Heidelberg, 1998, pp. 221-235.

[9] A. Shamir and Y. Tauman, "Improved online/offline signature schemes," in Proceedings of the 21st Annual International Cryptology Conference on Advances in Cryptology, ser. CRYPTO '01. London, UK: SpringerVerlag, 2001, pp. 355-367.

[10] D. Bernstein, N. Duif, T. Lange, P. Schwabe, and B.-Y. Yang, "Highspeed high-security signatures," Journal of Cryptographic Engineering, vol. 2, no. 2, pp. 77-89,2012.

[11] C. Costello and P. Longa, "Four Q: Four-dimensional decompositions on aQ-curve over the mersenne prime," in Advances in Cryptology—ASIACRYPT 2015, T. Iwata and J. H. Cheon, Eds. Springer Berlin Heidelberg, 2015, pp. 214-235.

[12] M. Bellare and P. Rogaway, "Random oracles are practical: A paradigm for designing efficient protocols," in Proceedings of the 1st ACM conference on Computer and Communications Security (CCS '93). NY, USA: ACM, 1993, pp. 62-73.

[13] C. Pereida Garcia, B. B. Brumley, and Y. Yarom, ""make sure dsa signing exponentiations really are constant-time"," in Proceedings of the 2016 ACM SIGSAC Conference on Computer and Communications Security, ser. CCS '16. New York, N.Y., USA: ACM, 2016, pp. 1639-1650.

[14] R. R. Jueneman, "Securing wireless medicine confidentiality, integrity, nonrepudiation, malware prevention," in Emerging Technologies for a Smarter World (CEWIT), 2011 8th International Conference Expo on, November 2011, pp. 1-5.

[15] C. Schnorr, "Efficient signature generation by smart cards," Journal of Cryptology, vol. 4, no. 3, pp. 161-174, 1991.

[16] I. Goldberg, "Improving the robustness of private information retrieval," in 2007 IEEE Symposium on Security and Privacy (SP '07), 2007, pp. 131-148.

[17] J. Katz and Y. Lindell, Introduction to Modern Cryptography. Chapman & Hall/CRC, 2007.

[18] I. S. P. Nguyen and J. Stern, "Distribution of modular sums and the security of the server aided exponentiation," in Proc. Workshop on Cryptography and Computational Number Theory (CCNT '99), vol. 20. Springer Berlin Heidelberg, pp. 257-268.

[19] D. Pointcheval and J. Stern, "Security proofs for signature schemes," in Proc. of the 15th International Conference on the Theory and Application of Cryptographic Techniques (EUROCRYPT '96). SpringerVerlag, 1996, pp. 387-398.

[20] M. Bellare and G. Neven, "Multi-signatures in the plain public-key model and a general forking lemma," in Proceedings of the 13th ACM Conference on Computer and Communications Security, ser. CCS '06. New York, N.Y., USA: ACM, 2006, pp. 390-399.

[21] P. Szakacs-Simon, S. A. Moraru, and F. Neukart, "Signal conditioning techniques for health monitoring devices," in 2012 35th International Conference on Telecommunications and Signal Processing (TSP), July 2012, pp. 610-614.

[22] J.-P. Aumasson, L. Henzen, W. Meier, and R. C.-W. Phan, "Sha-3 proposal blake," Submission to NIST (Round 3), 2010. [Online]. Available: http://131002.net/blake/blake.pdf

[23] D. J. Bernstein, "New stream cipher designs," M. Robshaw and O. Billet, Eds. Berlin, Heidelberg: Springer-Verlag, 2008, ch. The Salsa20 Family of Stream Ciphers, pp. 84-97. [Online]. Available: http://dx.doi.org/10.1007/978-3-540-68351-3_8

[24] M. Hutter and P. Schwabe, "NaCl on 8-bit AVR microcontrollers," in Progress in Cryptology—AFRICACRYPT 2013, ser. Lecture Notes in Computer Science, vol. 7918. Springer-Verlag Berlin Heidelberg, 2013, pp. 156-172, http://cryptojedi.org/papers/\#avrnacl.

[25] Z. Liu, P. Longa, G. C. C. F. Pereira, O. Reparaz, and H. Seo, "FourQ on embedded devices with strong countermeasures against side-channel attacks," in Cryptographic Hardware and Embedded Systems—CHES 2017, W. Fischer and N. Homma, Eds. Cham: Springer International Publishing, 2017, pp. 665-686.

[26] L. Reyzin and N. Reyzin, "Better than BiBa: Short one-time signatures with fast signing and verifying," in Proceedings of the 7th Australian Conference on Information Security and Privacy (ACIPS '02). SpringerVerlag, 2002, pp. 144-153.

[27] K. Kalach and R. Safavi-Naini, "An efficient post-quantum one-time signature scheme," in Selected Areas in Cryptography—SAC 2015, O. Dunkelman and L. Keliher, Eds. Cham: Springer International Publishing, 2016, pp. 331-351.

[28] D. J. Bernstein, D. Hopwood, A. Hülsing, T. Lange, R. Niederhagen, L. Papachristodoulou, M. Schneider, P. Schwabe, and Z. WilcoxO'Hearn, "SPHINCS: Practical stateless hash-based signatures," in Advances in Cryptology—EUROCRYPT 2015: 34th Annual International Conference on the Theory and Applications of Cryptographic Techniques. Springer Berlin Heidelberg, April 2015, pp. 368-397.

[29] A. Perrig, R. Canetti, D. Song, and D. Tygar, "Efficient and secure source authentication for multicast," in Proceedings of Network and Distributed System Security Symposium, February 2001.

[30] W. B. Jaballah, M. Conti, R. D. Pietro, M. Mosbah, and N. V. Verde, "Mass: An efficient and secure broadcast authentication scheme for resource constrained devices," in 2013 International Conference on Risks and Security of Internet and Systems (CRiSIS), October 2013, pp. 1-6.

[31] ANSI X9.62-1998: Public Key Cryptography for the Financial Services Industry: The Elliptic Curve Digital Signature Algorithm (ECDSA), American Bankers Association, 1999.

[32] D. J. Bernstein, N. Duif, T. Lange, P. Schwabe, and B.-Y. Yang, "High-speed high-security signatures," Journal of Cryptographic Engineering, vol. 2, no. 2, pp. 77-89, September 2012. [Online]. Available: https://doi.org/10.1007/s13389-012-0027-1

[33] M. Wazid, A. K. Das, N. Kumar, M. Conti, and A. V. Vasilakos, "A novel authentication and key agreement scheme for implantable medical devices deployment," IEEE Journal of Biomedical and Health Informatics, vol. 22, no. 4, pp. 1299-1309, July 2018

The invention claimed is:

1. A security system for authenticating the updating of computer records, comprising:
 a network of member computers in data communication with each other, the member computers comprising at least one verifier device and a plurality of server computers;
 a resource limited device comprising a computerized control circuit that generates a first private key (sk), secures message data with the first private key (sk), and transmits secured message data to the verifier device;

wherein the resource limited device generates the first private key and a public key as a pair from a given security parameter ($1^k$) stored on the resource limited device, from a secret key (y) stored on the resource limited device, and from a random number (r) generated on the resource limited device, and further wherein the resource limited device uses the secret key (y) as a seed to derive (L) Boyko-Peinado-Venkatesan (BPV) values ($z_j$) and sends to each of (L) server computers a data set Aj comprising ($z_j$, v, ⟨$R_{1,j}$, ..., $R_{n,j}$⟩) where j is unique for each of the (L) server computers, v is a system wide parameter, and $R_{n,j}$ is a respective public value computed from a respective random number ($r_{ij}$) established at the resource limited device for each server computer, where i=1 to "n" and where "j" is unique for each of the (L) server computers;

respective verifier processors and respective memory connected to the at least one verifier device;

respective server processors connected to the server computers, wherein each processor for the server computers is further connected to computerized memory storing software configured to calculate an assigned portion of a commitment code used for authenticating the secured message data at the verifier device by completing, among the server computers, a plurality of discrete verification tasks for respective single authentication codes Rj assigned to each respective server computer, wherein the respective single authentication codes Rj are associated with an aggregated commitment code (R), wherein the at least one verifier device is configured to:
aggregate the respective single authentication codes (Rj) from the server computers,
reconstruct the aggregated commitment code (R), and verify the secured message data at the verifier device with the aggregated commitment code (R).

2. A security system according to claim 1, wherein the resource limited device transmits, to the at least one verifier device, the secured message data as a message (m) and a signature (σ) created from the first private key (sk).

3. A security system according to claim 1, wherein the resource limited device transmits, to the at least one verifier device, a public key (PK) stored as an input at the verifier device.

4. A security system according to claim 1, wherein the resource limited device generates the first private key and a public key as a pair from a given security parameter ($1^k$) stored on the resource limited device, a secret key (y) stored on the resource limited device, and from a random number (r) generated on the resource limited device.

5. A security system according to claim 1, wherein the resource limited device generates a one-time random value (x) used in hashing the secured message data with a signature (σ) generated by the resource limited device from the first private key (sk).

6. A security system according to claim 5, wherein the system comprises a number (L) of server computers respectively holding one of (n) public values of (L) Boyko-Peinado-Venkatesan (BPV) tables.

7. A security system according to claim 1, wherein the resource limited device further sets system wide parameters (q, p, α, and v) prior to calculating the first private key and the public key.

8. A security system according to claim 7, wherein the resource limited device further calculates the respective ($r_{ij}$) random numbers for each of the L server computers, wherein the respective random numbers ($r_{ij}$) are used by the resource limited device to calculate the random number (r).

9. A security system according to claim 8, wherein the resource limited device generates an aggregated random number as the random number (r) from the secret BPV values ($z_j$).

10. A security system according to claim 9, wherein the at least one verifying device comprises software configured to generate the aggregated commitment code (R) as $$R \leftarrow \Pi_{j=1}^{L} \overline{R}_j \bmod \rho.$$

11. A security system according to claim 10 wherein generating the aggregated commitment code (R) comprises the verifier computer requesting the server computers to derive indexes from a previously stored BPV computation table, previously stored BPV generator variables (n, v) and system wide parameter (q) and to calculate a corresponding public value
{Ri,j}$^{n,L}$i-1,j=1 assigned to each of the server computers.

12. A security system according to claim 11, wherein the server computers aggregate respective corresponding public values {Ri,j}$^{n,L}$i-1, j=1 assigned to the respective server computers to form respective single authentication codes Rj sent to the verifier device.

13. A security system according to claim 1, wherein the network of member computers comprises secure communications channels.

14. A method of authenticating a computer record comprising:
using a resource limited device:
setting system parameters (n, v, q, p, α);
using a secret key (y) as a seed to derive a number (L) of Boyko-Peinado-Venkatesan (BPV) values ($z_j$);
generating a first private key (sk) and a public key (pk) as a pair from a given security parameter ($1^K$), the secret key (y), and from a random number (r) generated on the resource limited device, wherein the resource limited device calculates the random number (r) by calculating respective ($r_{i,j}$) random numbers for each of the number (L) server computers;
sending to each of the (L) server computers a data set Aj comprising (zj, v, ⟨R1, j, ... Rn, j⟩), wherein $R_{n,j}$ is a public value corresponding to the respective random numbers ($r_{i,j}$);
generating a one-time random value (x) used in hashing secured message data with a signature (σ) generated by the resource limited device from the first private key (sk);
transmitting the secured message data (m) to at least one verifier device for authentication;
using the (L) server computers, completing a plurality of discrete verification tasks for respective single authentication codes Rj assigned to each respective server computer, wherein the respective single authentication codes Rj are associated with an aggregated commitment code (R),
using the at least one verifier device:
aggregating the respective single authentication codes (Rj) from the server computers, and
reconstructing the aggregated commitment code (R);
and verifying the secured message data at the verifier device with the aggregated commitment code (R).

15. A method according to claim 14, further comprising, using the verifier device, generating the aggregated commitment code (R) as
$$R \leftarrow \Pi_{j=1}^{L} \overline{R}_j \bmod \rho.$$

16. A method according to claim 15, further comprising generating the aggregated commitment code (R) by the verifier computer requesting the server computers to derive indexes from a previously stored BPV computation table, previously stored BPV generator variables (n, v) and system wide parameter (q) and to calculate a corresponding public value set $\{R_{i,j}\}^{n,L}i{-}1, j{=}1$ assigned to each of the server computers.

17. A method according to claim 16, further comprising the server computers aggregating respective corresponding public values $\{R_{i,j}\}^{n,L}i{-}1, j{=}1$ assigned to the respective server computers to form respective single authentication codes Rj sent to the verifier device.

18. A method according to claim 17, wherein the verifier device compares the aggregated commitment code (R) to $Y^{H_2(m\|x)} \cdot \alpha^s$ mod ρ and if equal, then the verifier device authenticates the secured message data, if not equal, then the verifier device denies authenticity of the secured message data, wherein Y is a public key received by the verifier device from the resource limited device, $H_2$ is a hashing algorithm, m is the secured message data, x is a committed random value key received by the verifier device from the resource limited device, α and ρ are system variables key received by the verifier device from the resource limited device, and s is a portion of the signature value σ key received by the verifier device from the resource limited device.

19. A method according to claim 18, wherein the verifier device determines authenticity of the secured message data without receiving the random number (r) from the resource limited device.

* * * * *